United States Patent [19]

Watanabe

[11] Patent Number: 5,033,391
[45] Date of Patent: Jul. 23, 1991

[54] LAND TRANSPORTATION SYSTEM

[76] Inventor: Shin Watanabe, c/o 22-14, Ryoke 7-chome, Urawa-shi, Saitama-ken, Japan

[21] Appl. No.: 412,159

[22] Filed: Sep. 25, 1989

[30] Foreign Application Priority Data

Sep. 27, 1988 [JP] Japan .................................. 63-241840

[51] Int. Cl.⁵ .......................... B61B 13/10; B60V 3/04
[52] U.S. Cl. ................................ 104/23.2; 104/138.1; 104/292; 104/298; 105/365
[58] Field of Search ...................... 104/23.1, 138.1, 284, 104/289, 290, 292, 293, 295, 298, 300; 105/49, 365; 246/122 R

[56] References Cited

U.S. PATENT DOCUMENTS

| | | | |
|---|---|---|---|
| 376,567 | 1/1888 | Weems | 104/138.1 |
| 3,100,454 | 8/1963 | Dennis | 104/23.2 |
| 3,318,552 | 5/1967 | Panza et al. | 104/138.1 |
| 3,815,511 | 6/1974 | Dukowicz | 104/292 |
| 3,996,858 | 12/1978 | Sangl | 104/292 |
| 4,007,897 | 2/1977 | Auer | 104/295 |
| 4,532,511 | 7/1985 | Lemelson | 246/122 |
| 4,922,830 | 5/1990 | Fujita et al. | 104/290 |
| 4,926,753 | 5/1990 | Weiss | 104/289 |

Primary Examiner—Robert J. Oberleitner
Assistant Examiner—J. Joseph Morano
Attorney, Agent, or Firm—Fleit, Jacobson, Cohn, Price, Holman & Stern

[57] ABSTRACT

A Land transportation system has an unmanned mobile box which rides in a tube from one place to another. Guides are affixed to the center of the tube to cooperate with guide rollers on the box to stabilize the running of the box. Wings are provided on the side of the mobile box to provide a buoyancy effect while the box is running, thereby reducing the friction between the box and tube. Additional rollers are placed on the bottom of the box, and come into contact with the bottom surface of the tube when the box is running at slow speeds. The mobile box is driven by linear motor, with the controller for the motor being located outside the tube, and the primary and secondary coils of the motor being located in the tube and on the box. The mobile box also has a signal generator which transmits a prememorized identification signal to a receiver outside the box, to identify destination and other information about the mobile box as it traverses the tube.

7 Claims, 4 Drawing Sheets

F I G. 3
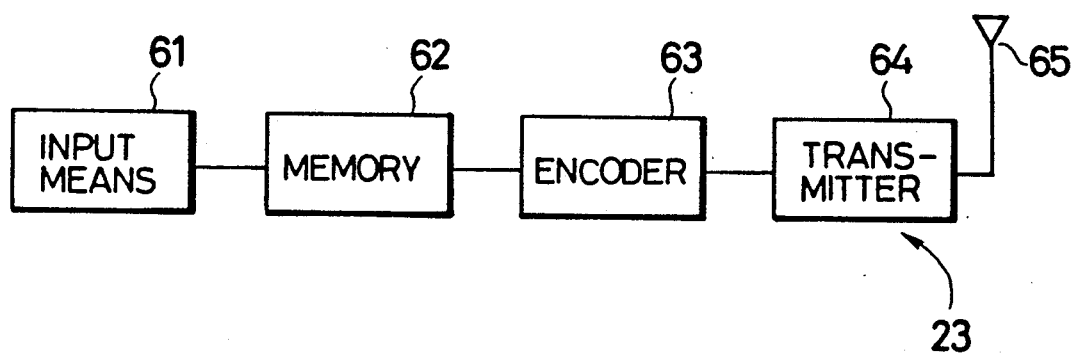
F I G. 4
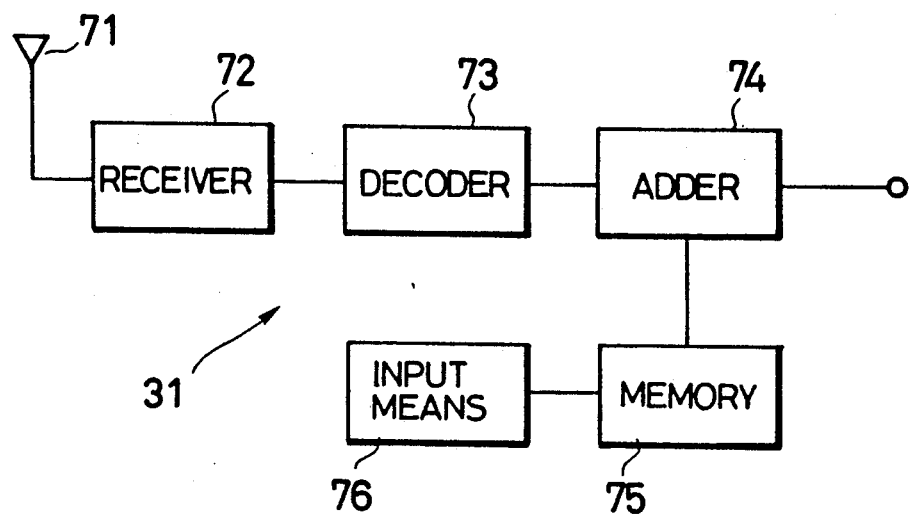

LAND TRANSPORTATION SYSTEM

BACKGROUND OF THE INVENTION

The invention relates to a land transportation system for transporting a freight to a remote place.

In a conventional transportation system, freight is transported by car to a nearest station or air port, from there to specific station or air port by rail or air, and further to a destination by car. In another system, the automobiles are used from the forwarding place to the destination.

In all these systems, however, the men are necessary for driving the trucks and freight cars or flying airplanes, and the transportation is affected by the weather.

SUMMARY OF THE INVENTION

An object of the invention is to solve the problems mentioned above.

Another object of the invention is to provide a land transportation system for transporting a freight without necessity of the drivers or pilots.

The third object of the invention is to provide a land transportation system which is not affected by the weather.

According to the invention there is provided a land transportation system comprising a pipe buried under the ground from the first place to the second place, an unmanned mobile box in which a freight is carried and which is moved in the pipe, a guide means fixed to the pipe for guiding the movement of the mobile box, a driving means for generating a driving force to drive the mobile box, a control device located outside of the pipe for controlling the driving means so that the unmanned mobile box moves in the pipe, an identification signal generating means located in the mobile box for generating an identification signal corresponding to each mobile box, and a detecting means for detecting the identification signal generated from identification generating means.

The unmanned mobile box is moved in the pipe buried under the ground. Therefore the transportation can be done without being affected by the weather.

BRIEF DESCRIPTION OF THE DRAWINGS

FIG. 3 is a block diagram of a generating device in a land transportation system according to the invention.

FIG. 4 is a block diagram of a detecting device in a land transportation system according to the invention.

DETAILED DESCRIPTION OF THE PREFERRED EMBODIMENT

Figure 1:
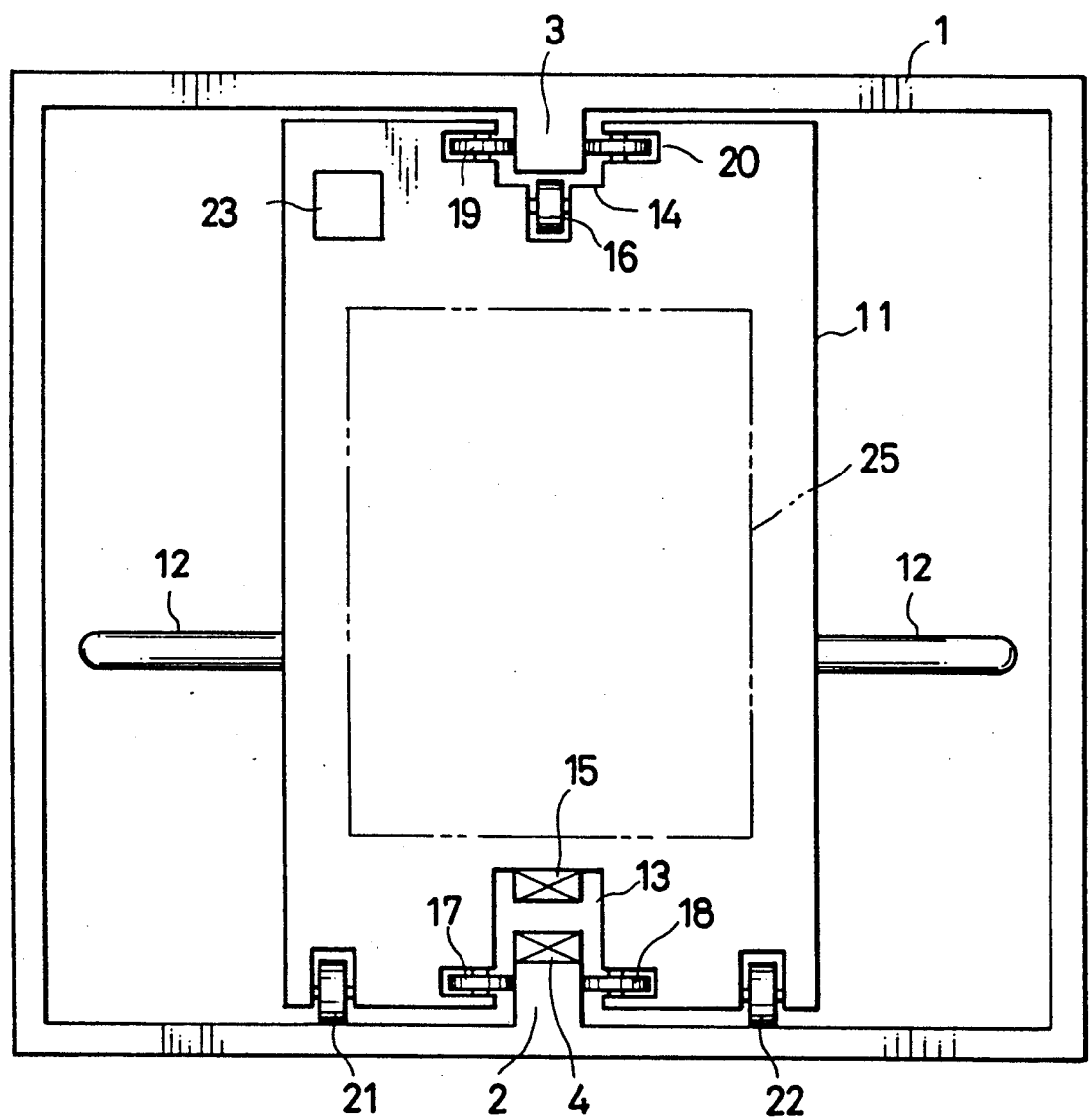
FIG. 1 is a longitudinal section of a pipe in a land transportation system according to the invention.

In FIG. 1, 1 designates a transportation pipe made of concrete for example which is buried under the ground beside or under the roads, railroads, railways etc. from specific place to another, from Tokyo to Osaka, for instance. Pipe 1 is fixed to specific position on the bridges. 2 and 3 are guide rails formed on the floor and ceiling of pipe 1, respectively. 4 is a coil which is fixed on guide rail 2 and constitutes a driving device.

11 is a mobile box made of synthetic resign or light metal like aluminum, which is relatively so small as it can be carried by a passenger car or motorcycle. 12 are wings which are attached to the side walls of mobile box 11 and generate a buoyance by pneumatic effect when mobile box 11 moves. 13 and 14 are grooves formed on the floor and ceiling of mobile box 11 so that the guide rails 2 and 3 can be inserted therein respectively without coming into contact with them. On the bottom of groove 13 attached is coil 15 constituting a driving means together with coil 4. Coil 15 is powered from a battery (not shown) carried on mobile box 11, and generates a driving force for driving mobile box 11 by interactions with coil 4. Accordingly a permanent magnet or super conductivity device can be applied to at least one of coils 4 and 15.

Roller 16 made of rubber is attached rotatably on the bottom of groove 14 so that it can come into contact with guide rail 3 when mobile box 11 goes up at the time of moving. 17 and 18, and 19 and 20 are rollers fitted rotatably on the side walls of grooves 13 and 14 so that they come into contact with the side walls of guide rails 2 and 3, respectively, and thereby the moving direction of mobile box 11 is adjusted. 21 and 22 are rotating members fixed rotatably on the bottom of mobile box 11. Rollers 17 to 20 and rotating members 21 and 22 can be tires. 23 designates a generating device carried on mobile box 11 for generating the identification (ID) codes and the destination information of each mobile box 11. 25 is a freight carried in mobile box 11.

Figure 2:
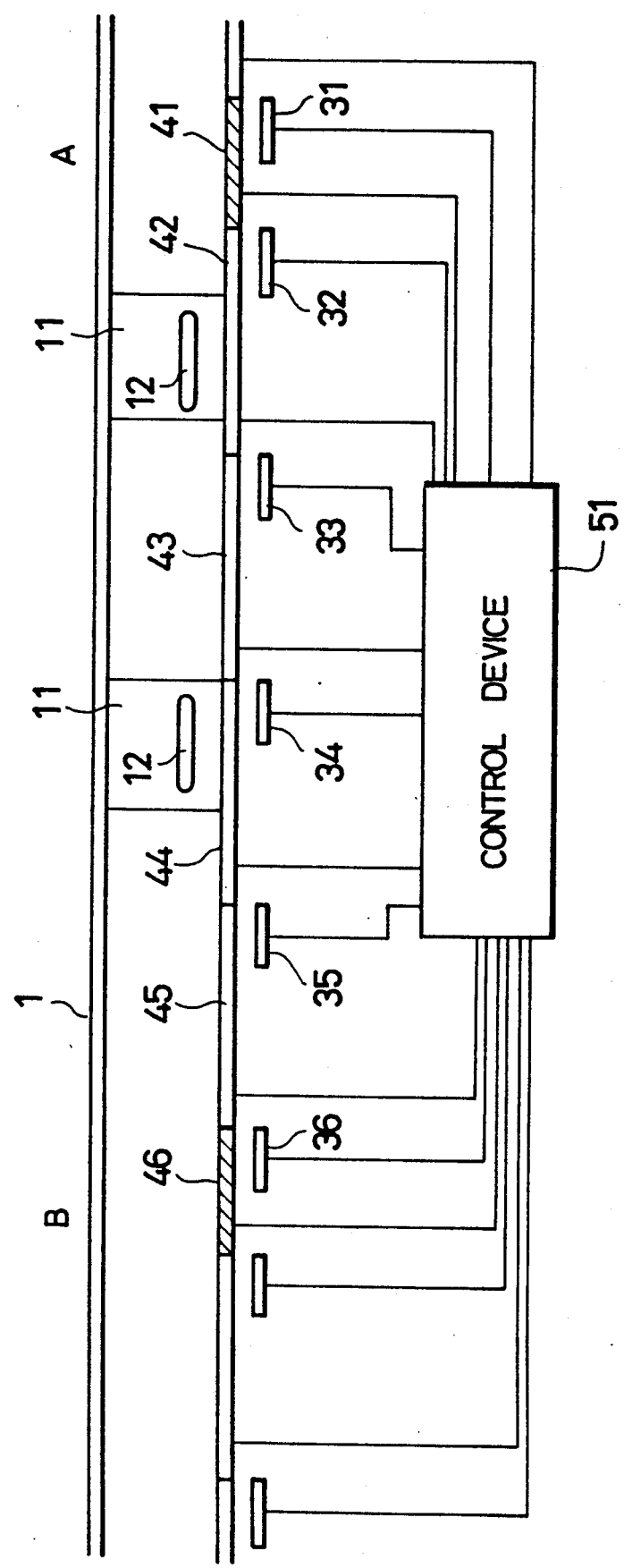
FIG. 2 is a cross section of a pipe in a land transportation system according to the invention.

In FIG. 2, pipe 1 is buried under the ground from place A to place B. Coil fixed to the floor of pipe 1 is divided into a plurality of territories 41 to 46 between places A and B, each of them being driven and controlled individually by control device 51 including a computer. 31 to 36 are detecting devices which are located in corresponding territories 41 to 46 in or out of pipe 1 and detect the moving positions, ID codes and destination information of mobile box 11 and output the detecting signals.

In generating device 23 shown in FIG. 3, the ID codes and destination information are inputted and memorized in memory 62 by manipulation of input means 61. 63 designates an encoder for encoding the ID codes and destination information. The encoded data is modulated by transmitter 64 and transmitted through antenna 65.

FIG. 4 is a block diagram of detecting device 31 (or 32 to 36). In the figure, 72 is a receiver for receiving the transmitted signals through antenna 71 and demodulating them. 73 designates a decoder for decoding the demodulated signals and 75 is a memory in which position information is memorized in accordance with the manipulation of input means 76. 74 is an adder for adding the outputs of decoder 73 and memory 75 and outputting them to control device 51.

The operation of the system will be described below. At place A for example, freight 25 is carried in mobile box 11 having a door (not shown) which can be unlocked and opened, and closed and locked. After that, in generating device 23 of mobile box 11, the destination of freight 25 (mobile box 11) is memorized in memory 62 by manipulation of input means 61. Also the ID codes of the mobile box 11 are memorized in advance in memory 62. The data memorized in memory 62 is read out, encoded by encoder 63 and transmitted by transmitter 23 through antenna 65 outside of mobile box 11 in pipe 1.

The radio signals outputted from antenna 65 is received by antenna 71 and demodulated by receiver 72 in detecting device 31. The demodulated signals are decoded by decoder 73 and provided control device 51 through adder 74 together with position information memorized in memory 75 for indicating the position at which detecting device 31 is located.

Figure 5:
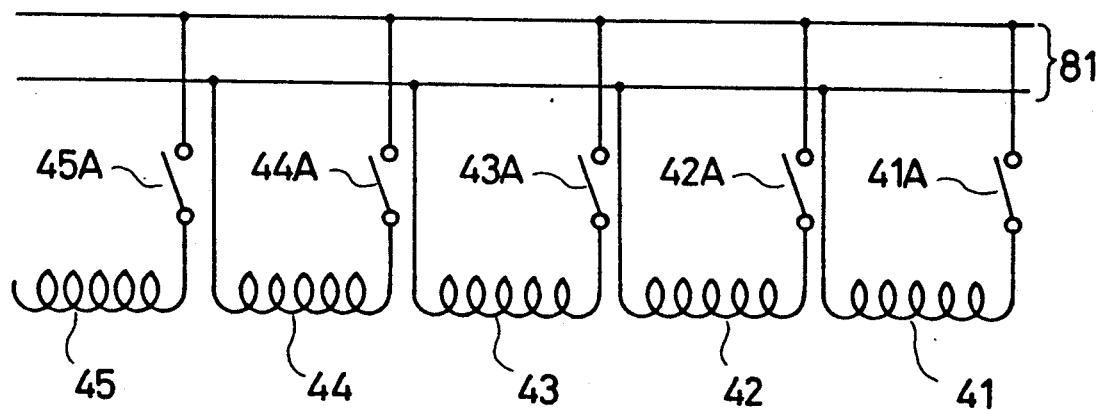
FIG. 5 is a circuit diagram of a coil divided into a plurality of territories.

The detected ID codes, destination information and position information are stored in a memory installed in control device 51. According to the detected dada, control device 51 controls territory 41 so as to generate a shifting magnetic field. As shown in FIG. 5, switch 41A is ON and a current is provided from power supply lines 81 to territory 41 through switch 41A. Mobile box 11 is moved for the destination of place B by the interaction between the shifting magnetic field and the magnetic field generated by coil 15 of mobile box 11.

The moving positions of mobile box 11 in pipe 1 are detected in series by detecting devices 32, 33, 34 . . . Control device 51 drives individually territories 42, 43, . . . through switches 42A, 43A . . . in series according to the output of each detecting device, and thereby mobile box 11 is moved smoothly without making the coil 15 long. Of course, at the boundary portion two serious territories can be driven simultaneously. Also when there are branches in pipe 1, a specific territory is selected and driven and mobile box 11 is guided to the destination.

When mobile box 11 stops rotating members 21 and 22 come into contact with the floor of pipe 1. When mobile box 11 moves at relatively high speed, wings 12 generate a buoyance which floats mobile box 11 and makes rotating members 21 and 22 part from the floor of pipe 1, or at least the friction between them reduced, and the energy consumption for movement is decreased. Mobile box 11 is prevented from being floated excessively by contact between roller 16 and guide rail 3.

Since the buoyance is actively used for movement it is not advantageous to apply such a driving system to mobile box 11 that rotating members 21 and 22 are driven as in usual electric cars because the floating makes driving difficult.

The movement of mobile box 11 in the direction perpendicular to guide rails 3 and 4 is prevented by the contacts between guide rails 2 and 3 and rollers 17 and 18 and 19 and 20, respectively. Therefore mobile box 11 moves along guide rails 2 and 3.

When mobile box 11 reaches specific territory near the destination, control device 51 makes the territory generate a shifting magnetic field in the opposite direction. Therefore the velocity of mobile box 11 is reduced gradually and mobile box 11 stops at the destination of place B. The door of mobile box 11 is unlocked and opened and freight 25 is taken out from mobile box 11, or mobile box 11 is taken out from pipe 1. Furthermore the freight or mobile box is carried on a motorcycle, passenger car, or truck, and transported to the addressee.

When mobile box 11 is transported by the automobile, wings 12 and rotating members 21 and 22 can be constituted such that they can advance and retreat at need.

Also, as a buoyance generating means, a taper surface can be formed between the bottom and front face of mobile box 11.

What is claimed is:

1. A land transportation system comprising a pipe buried under the ground from a first place to a second place, an unmanned mobile box in which freight is carried movably mounted in the pipe for movement between said first place and said second place, a guide means fixed to the interior of the pipe in engagement with the mobile box for guiding the movement of the mobile box, a driving means mounted in the interior of the pipe for generating a driving force to drive the mobile box, a control device located outside of the pipe for controlling the driving means so that the unmanned mobile box moves in the pipe, an identification signal generating means located in the mobile box for generating an identification signal corresponding to each mobile box, a detecting means located outside of the pipe for detecting the identification signal generated from the identification signal generating means, a buoyance generating means on the mobile box which reduces the friction between the pipe and the mobile box when the mobile box moves, and rotating members mounted on the bottom of said mobile box which come into contact with the floor of the pipe when the mobile box is moving at a relatively slow speed.

2. A land transportation system according to claim 1, wherein the driving means comprises
a first coil fixed to the floor of the pipe, and
a second coil fixed to the bottom of the mobile box,
the first and second coils generating the driving force by interaction between them.

3. A land transportation system according to claim 2, wherein the first coil is divided into a plurality of territories, and each territory has a switch which is controlled by the control device so that each territory can be driven individually by the control device.

4. A land transportation system according to claim 1, wherein the identification signal generating means comprises
a memory for memorizing and outputting the identification signal of the mobile box,
a transmitter for modulating the identification signal outputted from the memory,
a transmitting antenna for transmitting the identification signal modulated by the transmitter.

5. A land transportation system according to claim 4, wherein the detecting means comprises
a receiving antenna for receiving the identification signal transmitted from the transmitting antenna, and
a receiver for demodulating the identification signal received by the receiving antenna.

6. A land transportation system according to claim 5, wherein the detecting means further comprises
a position memory for memorizing a position signal indicating the position where the detecting means is located.

7. A land transportation system according to claim 4, wherein the memory further memorizes destination information which is transmitted by the transmitter together with the identification signal.

8. A land transportation system according to claim 1, wherein the buoyance generating means comprises wings fixed to the side walls of the mobile box.

* * * * *